Oct. 1, 1946.  T. L. MORRIS  2,408,574
HYDRAULIC TRANSMISSION
Filed May 12, 1943  2 Sheets-Sheet 1

Inventor:
THOMAS L. MORRIS,
By Jesse P. Whann
Attorney.

Oct. 1, 1946. T. L. MORRIS 2,408,574
HYDRAULIC TRANSMISSION
Filed May 12, 1943 2 Sheets-Sheet 2

Inventor:
THOMAS L. MORRIS,
By Jesse P. Whann
Attorney.

Patented Oct. 1, 1946

2,408,574

UNITED STATES PATENT OFFICE 2,408,574

HYDRAULIC TRANSMISSION

Thomas L. Morris, Van Nuys, Calif., assignor of one-half to Floyd M. Boes, North Hollywood, Calif.

Application May 12, 1943, Serial No. 486,661

19 Claims. (Cl. 192—59)

This invention is an improvement in gearless transmissions of especial utility as a means for transmitting power from the engine of an automobile to the drive shaft which is connected with the wheels, and is a continuation-in-part of the disclosure of my copending application, Serial No. 454,771, filed August 14, 1942, for Fluid transmission.

It is an object of the invention to provide a simplified cooperative arrangement of parts in a gearless transmission which will operate automatically as the speed of the engine is increased to gradually transmit the driving torque from the driving member of the device to the driven member.

It is a further object of the invention to provide a transmission of this character having means whereby the automatic control may be locked either in inactive condition or in fully active condition, making it possible to operate the engine at any desired speed for the purpose of testing or tuning without any drive force being transmitted through the device, or to assure positive drive connection through the device at all times, and, as for example, when the vehicle in which the device is used is running downhill and compression of the engine is to be utilized as a braking means.

A further object of the invention is to provide a transmission device of the character described having one part rotatable within another part, with the parts so related that standard bearings may be employed, thereby avoiding the necessity of making expensive special types of bearings for rotatably interconnecting the rotatable parts.

A further object is to provide a device wherein a plurality of pistons are reciprocated by an adjustable tilting plate which has oscillating movement around a point and is accordingly referred to as a wobble plate, with the addition of adjustable valve means for controlling the flow of liquid in and out of the cylinders in which the pistons move, the wobble plate and the valve means being both automatically adjusted by a governor mechanism associated with one of the rotating parts of the device.

It is an object of the invention to provide a transmission of the character described herein having a governor connected to the drive member of the device so as to rotate at speeds proportionate to the speeds of rotation of the drive member, this governor simultaneously adjusting the stroke of the pistons of the device and the flow restricting characteristics of the valves associated with the cylinders in which the pistons operate.

A further object is to provide a power transmission wherein the cylinders are arranged around the axis of rotation with the axes of the cylinders extending in the general direction defined by the axis of rotation, there being valves at the rearward portions of the cylinders and pistons with portions projecting from the forward ends of the cylinders, with means for reciprocating the pistons disposed at the front ends of the cylinders, and a governor device having a part for adjusting the throw of the piston actuating means, and a part which extends through the piston actuating means and through the zone occupied by the cylinders to connect with the valve means disposed at the rearward portions of the cylinders, to vary the flow-restricting characteristics of the valve means, as the velocity or speed of rotation of the governor increases.

Further objects and advantages of the invention will be brought out in the following part of the specification.

Referring to the drawings which are for illustrative purposes only,

Figure 1:
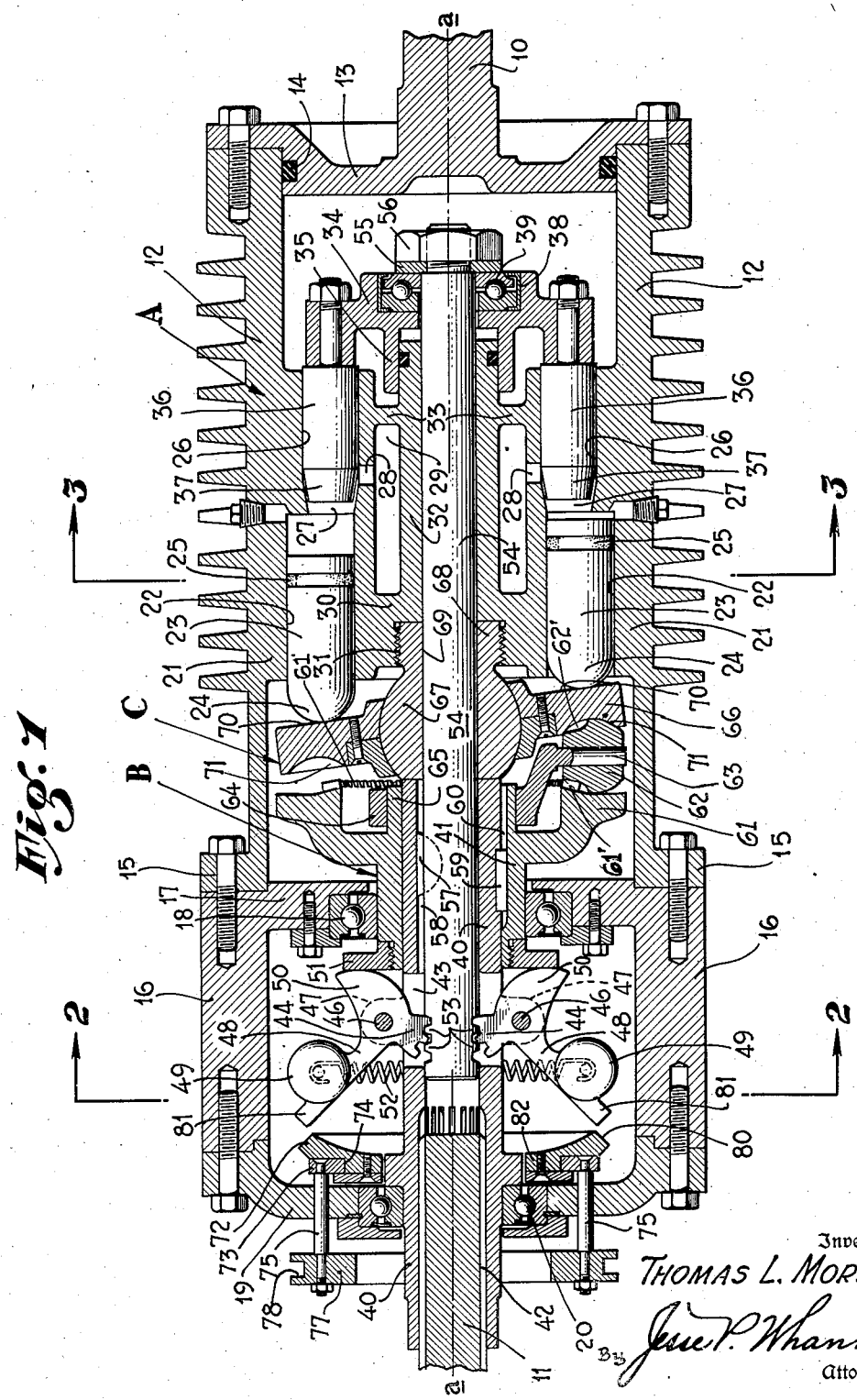
Fig. 1 is a longitudinal sectional view of a preferred embodiment of the invention.
Figure 2:
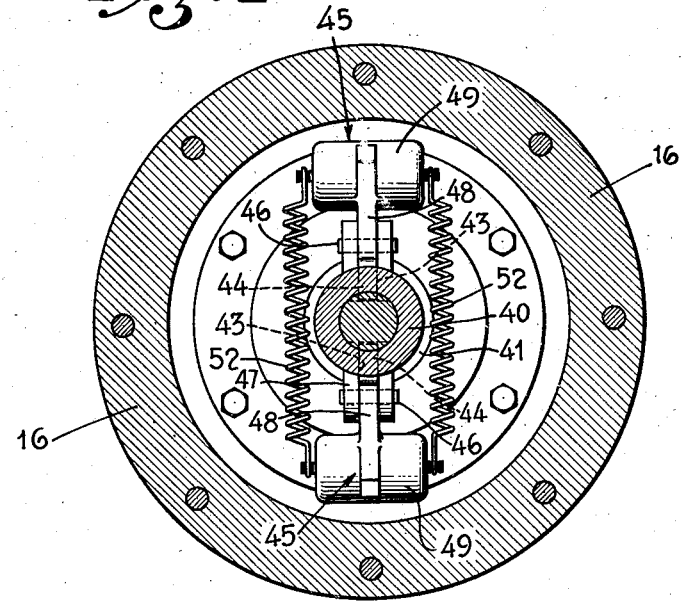
Fig. 2 is a cross-sectional view taken as indicated by the line 2—2 of Fig. 1.

As shown in Fig. 1, my invention includes relatively rotatable members A and B arranged in cooperative relation so as to revolve around a common axis a—a. In the form of the invention disclosed, rotatable member A is the driven part of the device and is provided with a projecting shaft member 10 for connection to the drive shaft of an automobile through which power is transmitted to the wheels thereof. The rotatable member B in the form of the invention disclosed is the driving member and has a splined shaft 11 for connection to the engine of the automobile.

Figure 3:
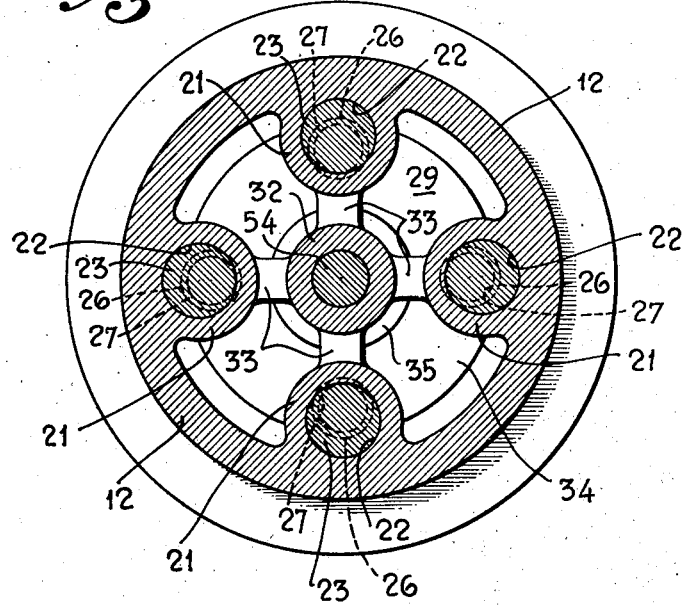
Fig. 3 is a cross-sectional view taken on the plane indicated by the line 3—3 of Fig. 1.

The rotatable member A comprises a cylindrical shell section 12, the rearward end of which is closed by a plate 13 which carries the shaft portion 10 and is sealed against escape of fluid by a sealing ring 14. At the leftward or forward end of the shell 12 there is a flange 15 for connection to a short cylindrical section 16 having at its front end an inwardly extending radial wall 17 adapted to carry a bearing 18, and having at its forward end a cover plate 19 having an axial opening in which a radial bearing 20 is held. The cylindrical section 12 has inwardly projecting bodies 21, as shown in Figs. 1 and 3 bored respectively so as to provide a plurality of cylinders 22 which are open at the forward ends and slidably receive pistons 23 having rounded forward ends 24 which project from the front ends of the cylinders 22. These pistons 23 are provided with sealing rings 25. The inwardly projecting bodies 21 are also provided with bores 26 which lead inwardly from the rear ends of the bodies 21 and connect with the rearward ends of the cylinders 22 so as to provide ports 27 which communicate through openings 28 with an internal oil space or reservoir 29.

The front end of the oil space 29 is closed by a radial wall 30 having a threaded counterbore 31 and a rearwardly extending tubular portion 32, the rearward portion of the tube 32 being supported by webs 33. At the rearward end of the tube 32 there is a spider 34 having a cylindrical wall in sliding engagement with the rearward end of the tube 32. This spider is axially movable and carries thereon cylindrical valve closures 36 which slide in the bores 26 and have their forward ends 37 shaped so as to cooperate with the ports 27 so that the flow of oil through the ports 27 may be varied. The spider 34 has a counterbore 38 in which a thrust bearing 39 operates as will be hereinafter described.

The rotatable member B includes a tubular body 40 which rotates in the bearings 18 and 20, the leftward end of this tubular body directly engaging the inner part of the bearing 20 and the rightward portion of the tubular body 40 having axially slidable thereon a sleeve 41, which sleeve 41 in turn engages the inner race of the bearing 18. The sleeve or tubular body 40 is splined at 42 to receive the shaft 11, and intermediate the ends thereof has diametrally disposed slots 43 through which gear segments 44 of counterweights 45 project, these counterweights 45 being swingable on pins 46 which are carried by lugs which project from the tubular member 40 on opposite sides of the slots 43.

The counterweight members 45 include forwardly projecting arms 48 which carry weights 49 and rearwardly projecting cams 50 which engage a flange 51 connected to the leftward end of the sleeve 41. A spring 52 of suitable strength is connected to the counterweight arms 48 to urge the same radially inward toward the tubular member 40. The gear segments 44 engage rack teeth 53 formed on the leftward end of the bar 54 which extends through the rightward portion of the tubular member 40, the tubular member 32 and the spider 34. A shoulder is provided at the rightward end of the bar 54 for engagement with the thrust bearing 39 by a washer 55 and a nut 56. The bar 54 is caused to rotate with the tubular member 40 by a key 57 which is seated in the bar 54 and engages a keyway 58 in the rightward portion of the tubular member 40, permitting axial movement of the bar 54.

The sleeve 41 forms part of a piston actuating means C and is axially slidable on the sleeve 40, but is caused to rotate with the sleeve by a key 59 which is seated in the tubular member 40 and engages a key slot 60 in the bore of the sleeve 41. The rightward portion of the sleeve 41 carries a flange 61 which engages the roller 62 mounted on an axle 63 which projects radially from a ring 64 rotatably mounted on the rightward extension 65 of the sleeve 41.

The actuating mechanism C includes a wobble plate 66 which is supported for oscillation on a spheroidal body 67 having an extension 68 which is threaded into the counterbore 31. The body 67 has an axial bore 69 through which the bar 54 passes.

The wobble plate 66 has an annular radial face 70 to engage the rounded ends of the piston 23, and on the forward side thereof has an annular channel 71 of arcuate cross-section in which the roller 62 may roll.

In Fig. 1 the device is shown with its parts in positions which they assume during operation. The tubular member 40 is in rotation, and consequently the weights 49 are swung outward, with the result that the gear segments 44 have been rotated in a direction to pull the bar 54 leftward and thereby move the valve members 36 toward the ports 27 of the cylinders so as to restrict the flow of liquid through the ports. At the same time the cams 50 of the counterweight means are rotated inward toward the axis $a$—$a$ so as to force the sleeve 49 and the flange 61 rightward, thereby moving the roller 62 in rightward direction so that the wobble plate 67 is swung into a diagonal position. The flange 61 is in rotation and the teeth 61' thereon engage the teeth 62' formed at the inner side of the roller 62 to cause it to roll around the groove 71 of the wobble plate. Whether or not this rolling occurs and the relative velocity of the roller on the shaft 63, both depend upon whether or not the driven member A is in rotation. For example, if the driven member A is rotated at the same rate of speed as the flange 61, the wobble plate and the shaft 63 will rotate in unison with the flange 61 around the axis $a$—$a$. On the other hand, should the driven member A be stationary, the wobble plate 66 will not be in rotation around the axis $a$—$a$ and the roller 62 will roll around the groove 71, causing the wobble plate 66 to oscillate, and causing the shaft 63 to move with an angular velocity which will be half the angular velocity of the flange 61, due to the characteristics of the roller 62 in rolling between two members. When the tubular member 40 and the flange 61 are both stationary or at a low rate of rotation, the spring 52 retracts the counterweights 49 so that the bar 54 is moved rightward by the gear segments 44, thereby shifting the valve closures 36 into fully opened position relatively to the ports 27, and raising the cams 50 so that the sleeve 41 and the flange 61 may shift leftward to permit the wobble plate 66 to assume a position perpendicular to the axis $a$—$a$. At this time there will be no driving effect from the rotatable member B to the rotatable member A. As the speed of rotation of the member 41 is increased, the counterweights 49 will gradually swing outward, with the result that there will be a gradual rightward movement of the flange 61 and a gradual movement of the valve closures 36 in leftward direction toward flow-restricting positions relatively to the ports 27. The rightward shifting of the flange 61 will in turn gradually rightwardly shift the roller 62 so that the wobble plate 66 will be first caused to oscillate through a small angle and produce short reciprocations of the pistons 23 which will be gradually increased in keeping with the increase of wobble imparted to the wobble plate as the result of the continued outward movement of the counterweights 49. The wobble plate, when oscillated, imparts torque impulses to the projecting ends 24 of the pistons, through which these torque impulses are carried to the shell 12 and the shaft 10 of the driven member A. During the starting of the power transmitting effect, the wobble plate is oscillated at high velocity, but through relatively small angles so that relatively rapid torque impulses are transmitted from the drive member B to the driven member A, and as the counterweights 49 swing outwardly, the angular movement of the wobble plate is increased, but, since the driven member A has started to rotate and will normally continue to accelerate, the speed of the flange 61 relative to the driven member A will decrease, and the rapidity of the torque impulses will likewise decrease, but will be of greater strength due to the increased angularity of the wobble plate 66.

My present invention provides means for locking the counterweights 49 either in retracted position or in extended position. Such means comprises a ring 72 carried adjacent the end plate 19 by a second ring 73 which projects into an annular channel 74 in the ring 72. The ring 73 is carried by several slide rods 75 which are parallel to the axis a—a and project through the end plate 19. The outer ends of the slide bars 75 are connected to an actuating ring 77 having a peripheral annular channel 78 adapted to be engaged by suitable shifting means such as a yoke (not shown) of the type employed for shifting clutches or gears. When the transmission device is in operation, the counterweights 49 swung outward, it may be locked in this position by shifting the ring 77 rightward so as to carry the ring 74 rightward from the position in which it is shown in full lines to a position wherein the conoidal face 80 thereof will engage the inner faces of the end portions 81 of the counterweight arms 48. The counterweights 49 will be thus prevented from swinging inward. Operation of the device may be prevented by shifting the ring 72 rightward when the counterweights 49 are in retracted position, thus causing the inner portion 82 of the ring 72 to overlie the projecting end portions 81 of the counterweight arms 48, thereby preventing the counterweight arms from moving outward in response to rotation of the rotatable member B which includes the counterweight means 45. At this time it will be possible to operate the engine at any speed, as for the purpose of checking, warming up, or tuning the same, without transmitting torque through the driven member A to the drive shaft.

A feature of the invention resides in the gear reduction effect which takes place between the flange 61 of the drive means B, resulting from the fact that the rolling of the roller 62 between the members 61 and 66 results in only one revolution of the roller 62 around the axis a—a and one reciprocation of the wobble plate 66 for each two revolutions of the flange 61 around the axis a—a. Furthermore, the bottom of the arcuate channel 71 is disposed close to the transverse plane of the wobble plate 66, which plane b—b passes through the center of the spheroidal body 67 on which the wobble plate 66 rocks. Accordingly, the distance of the groove 71 from the axis a—a changes but very little during the wobbling motion of the wobble plate 66, and the movement of the roller 62 axially on the pin 63 and radially with respect to the axis a—a is very small and the radial movement of the teeth 62' relatively to the gear teeth 61' is so small as to substantially not at all affect the interengagement and cooperation of the teeth 61' and 62' to positively rotate the roller 62 on the pin 63 as the result of relative rotation of the flange 61.

I claim as my invention:

1. In a power transmission of the character described, the combination of: first and second rotatable members disposed in cooperative relation on a common axis, there being means to connect one of them to a device to be driven and the other of them to a rotating drive means; a plurality of cylinders carried by said first member around said common axis, said cylinders having ports through which liquid may flow; means for holding a body of liquid so that it may flow in and out of said ports; valve means for opening and closing said ports; pistons operable in said cylinders; means for operating said pistons comprising a wobble plate supported so that it will oscillate and consecutively actuate said pistons in said cylinders, said wobble plate being movable between a position normal to said axis and a position diagonal to said axis; and means for moving said wobble plate from said position normal to said axis and causing the same to wobble in a diagonal position and for simultaneously applying a closing movement to said valve means.

2. In a power transmission of the character described, the combination of: first and second rotatable members disposed in cooperative relation on a common axis, there being means to connect one of them to a device to be driven and the other of them to a rotating drive means; a plurality of cylinders carried by said first member around said common axis, said cylinders having ports through which liquid may flow; means for holding a body of liquid so that it may flow in and out of said ports; valve means for controlling the flow through said ports; pistons operable in said cylinders; means for operating said pistons comprising a wobble plate supported so that it will oscillate and consecutively actuate said pistons in said cylinders, said wobble plate being movable between a position normal to said axis and a position diagonal to said axis, governor means connected so as to rotate at speeds proportionate to the speed of rotation of one of said members, and means driven by said second member and operated by said governor means so as to move said wobble plate from said position normal to said axis and cause the same to wobble in a diagonal position; and means operated by said governor so as to apply a closing movement to said valve means.

3. In a power transmission of the character described, the combination of: first and second rotatable members disposed in cooperative relation on a common axis, there being means to connect one of them to a device to be driven and the other of them to a rotating drive means; a plurality of cylinders carried by said first member around said common axis, said cylinders having ports through which liquid may flow; means for holding a body of liquid so that it may flow in and out of said ports; valve means for controlling the flow through said ports; pistons operable in said cylinders; means for operating said pistons comprising a wobble plate supported so that it will oscillate and consecutively actuate said pistons in said cylinders, said wobble plate being movable between a position normal to said axis and a position diagonal to said axis, governor means connected to said second rotatable member so as to rotate at a speed proportionate to the speed of rotation of said second rotatable member, and means driven by said second member and operated by said governor means so as to move said wobble plate from said position normal to said axis and cause the same to wobble in a diagonal position; and means operated by said governor so as to apply a closing movement to said valve means.

4. In a power transmission of the character described, the combination of: first and second rotatable members disposed in cooperative relation on a common axis, there being means to connect one of them to a device to be driven and the other of them to a rotating drive means; a plurality of cylinders carried by said first member around said common axis, said cylinders having ports through which liquid may flow; means for holding a body of liquid so that it may flow in and out of said ports; valve means for controlling the flow through said ports; pistons operable in said cylinders; means for operating said pistons comprising a wobble plate supported so that it will oscillate and consecutively actuate said pistons in said cylinders, said wobble plate being movable between a position normal to said axis and a position diagonal to said axis, governor means connected so as to rotate at speeds proportionate to the speed of rotation of one of said members, means driven by said second member and operated by said governor means so as to move said wobble plate from said position normal to said axis and cause the same to wobble in a diagonal position; and means operated by said governor so as to apply a closing movement to said valve means; and means for locking said governor when it is in the state thereof resulting normally from rotation at relatively high velocity.

5. In a power transmission of the character described, the combination of: first and second rotatable members disposed in cooperative relation on a common axis, there being means to connect one of them to a device to be driven and the other of them to a rotating drive means; a plurality of cylinders carried by said first member around said common axis, said cylinders having ports through which liquid may flow; means for holding a body of liquid so that it may flow in and out of said ports; valve means for controlling the flow through said ports; pistons operable in said cylinders; means for operating said pistons comprising a wobble plate supported so that it will oscillate and consecutively acutate said pistons in said cylinders, said wobble plate being movable between a position normal to said axis and a position diagonal to said axis, governor means connected so as to rotate at speeds proportionate to the speed of rotation of one of said members, said governor means having a part which is in retracted position when said governor means rotates at low speed and moves outward to an outer position when said governor means rotates at high speed, means driven by said second member and operated by said governor means so as to move said wobble plate from said position normal to said axis and cause the same to wobble in a diagonal position; and means operated by said governor so as to apply a closing movement to said valve means; and means separate from the rotation of said governor means for controlling movement of said part.

6. In a power transmission of the character described, the combination of: first and second rotatable members disposed in cooperative relation on a common axis, there being means to connect one of them to a device to be driven and the other of them to a rotating drive means; a plurality of cylinders carried by said first member around said common axis, said cylinders having ports through which liquid may flow; means for holding a body of liquid so that it may flow in and out of said ports; valve means for controlling the flow through said ports; pistons operable in said cylinders; means for operating said pistons comprising a wobble plate supported so that it will oscillate and consecutively actuate said pistons in said cylinders, said wobble plate being movable between a position normal to said axis and a position diagonal to said axis, governor means connected so as to rotate at speeds proportionate to the speed of rotation of one of said members, said governor means having a part which is in retracted position when said governor means rotates at low speed and moves outward to an outer position when said governor means rotates at high speed, means driven by said second member and operated by said governor means so as to move said wobble plate from said position normal to said axis and cause the same to wobble in a diagonal position; and means operated by said governor so as to apply a closing movement to said valve means; and means for locking said part of said governor means in said retracted and outer positions thereof.

7. In a power transmission of the character described, the combination of: first and second rotatable members disposed in cooperative relation on a common axis, there being means to connect one of them to a device to be driven and the other of them to a rotating drive means; a plurality of cylinders carried by said first member around said common axis, said cylinders having ports through which liquid may flow; means for holding a body of liquid so that it may flow in and out of said ports; valve means for opening and closing said ports; pistons operable in said cylinders; means driven by said second member for operating said pistons in said cylinders, said means being adjustable so as to vary the stroke of said pistons in said cylinders; and means for actuating said operating means so as to change the stroke of said pistons and for changing the flow-restricting characteristics of said valve means.

8. In a power transmission of the character described, the combination of: first and second rotatable members disposed in cooperative relation on a common axis, there being means to connect one of them to a device to be driven and the other of them to a rotating drive means; a plurality of cylinders carried by said first member around said common axis, said cylinders having ports through which liquid may flow; means for holding a body of liquid so that it may flow in and out of said ports; valve means for opening and closing said ports; pistons operable in said cylinders; means driven by said second member for operating said pistons in said cylinders, said means being adjustable so as to vary the stroke of said pistons in said cylinders; and governor means rotated by at least one of said members, said governor means having operative connection for changing the stroke of said pistons and changing the flow-restricting characteristics of said valve means.

9. In a power transmission of the character described, the combination of: first and second rotatable members disposed in cooperative relation on a common axis, there being means to connect one of them to a device to be driven and the other of them to a rotating drive means; a plurality of cylinders carried by said first member around said common axis, said cylinders having ports through which liquid may flow;

means for holding a body of liquid so that it may flow in and out of said ports; pistons operable in said cylinders; and means for operating said pistons comprising a wobble plate supported so that it will oscillate and consecutively actuate said pistons in said cylinders, an annular member rotating with said second member in spaced relation to said wobble plate, and a roller disposed between said annular member and said wobble plate and to roll therebetweeen through an annular path at a velocity which is intermediate the velocities of said annular member and said wobble plate.

10. In a power transmission of the character described, the combination of: first and second rotatable members disposed in cooperative relation on a common axis, there being means to connect one of them to a device to be driven and the other of them to a rotating drive means; a plurality of cylinders carried by said first member around said common axis, said cylinders having ports through which liquid may flow; means for holding a body of liquid so that it may flow in and out of said ports; pistons operable in said cylinders; and means for operating said pistons comprising a wobble plate supported so that it will oscillate and consecutively actuate said pistons in said cylinders, an annular member rotating with said second member in spaced relation to said wobble plate, a roller disposed between said annular member and said wobble plate and to roll therebetween through an annular path at a velocity which is intermediate the velocities of said annular member and said wobble plate, and means to axially shift said annular member.

11. In a power transmission of the character described, the combination of: first and second rotatable members disposed in cooperative relation on a common axis, there being means to connect one of them to a device to be driven and the other of them to a rotating drive means; a plurality of cylinders carried by said first member around said common axis, said cylinders having ports through which liquid may flow; means for holding a body of liquid so that it may flow in and out of said ports; pistons operable in said cylinders; and means for operating said pistons comprising a wobble plate supported so that it will oscillate and consecutively actuate said pistons in said cylinders, said wobble plate having an arcuate annular channel in a radial face thereof, an annular member rotating with said second member in spaced relation to said wobble plate, and a spheroidal roller disposed between said annular member and said wobble plate and to roll therebetween through an annular path at a velocity which is intermediate the velocities of said annular member and said wobble plate.

12. In a power transmission of the character described, the combination of: first and second rotatable members disposed in cooperative relation on a common axis, there being means to connect one of them to a device to be driven and the other of them to a rotating drive means; a plurality of cylinders carried by said first member around said common axis, said cylinders having ports through which liquid may flow; means for holding a body of liquid so that it may flow in and out of said ports; valve means for opening and closing said ports; pistons operable in said cylinders; and means for operating said pistons comprising a wobble plate supported so that it will oscillate and consecutively actuate said pistons in said cylinders, an annular member rotating with said second member in spaced relation to said wobble plate, a roller disposed between said annular member and said wobble plate and to roll therebetween through an annular path at a velocity which is intermediate the velocities of said annular member and said wobble plate, and means to axially shift said annular member and for actuating said valve means.

13. In a power transmission of the character described, the combination of: first and second rotatable members disposed in cooperative relation on a common axis, there being means to connect one of them to a device to be driven and the other of them to a rotating drive means; a plurality of cylinders carried by said first member around said common axis and extending in the general direction defined by said common axis, said cylinders having ports through which liquid may flow; means for holding a body of liquid so that it may flow in and out of said ports; valve means for opening and closing said ports; pistons operable in said cylinders; means for operating said pistons comprising a wobble plate supported by said first member so that it will oscillate and consecutively actuate said pistons in said cylinders, said wobble plate being movable between a position normal to said axis and a position diagonal to said axis; and means for moving said wobble plate from said position normal to said axis and causing the same to wobble in a diagonal position and for applying closing movement to said valve means, comprising a governor carried by said second member so as to rotate therewith, means rotating with said second member for transmitting movement from said governor to said wobble plate and means for transmitting movement from said governor to said valve means.

14. In a power transmission of the character described, the combination of: first and second rotatable members disposed in cooperative relation on a common axis, there being means to connect one of them to a device to be driven and the other of them to a rotating drive means; a plurality of cylinders carried by said first member around said common axis and extending in the general direction defined by said common axis, said cylinders having ports at the rearward portions thereof through which liquid may flow; means for holding a body of liquid so that it may flow in and out of said ports; valve means for opening and closing said ports; pistons operable in said cylinders; means for operating said pistons comprising a wobble plate supported by said first member at the front ends of said cylinders so that it will oscillate and consecutively actuate said pistons in said cylinders, said wobble plate being movable between a position normal to said axis and a position diagonal to said axis; and means for moving said wobble plate from said position normal to said axis and causing the same to wobble in a diagonal position and for applying closing movement to said valve means, comprising a governor carried by said second member so as to rotate therewith, means rotating with said second member for transmitting movement from said governor to said wobble plate and means comprising a bar extending from said second member through said wobble plate to the rearward portions of said cylinders for transmitting movement from said governor to said valve means.

15. In a power transmission of the character described, the combination of: first and second rotatable members disposed in cooperative relation on a common axis, there being means to connect one of them to a device to be driven and the other of them to a rotating drive means; reciprocable reaction means carried by said first member and being adapted to resist reciprocation; and means for reciprocating said reaction means comprising a wobble plate supported so that it will oscillate and reciprocate said reaction means, an annular member rotating with said second member in a plane perpendicular to said axis and in spaced relation to said wobble plate, and a roller disposed between said annular member and said wobble plate and to roll therebetween through an annular path at a velocity which is intermediate the velocities of said annular member and said wobble plate.

16. In a power transmission of the character described, the combination of: first and second rotatable members disposed in cooperative relation on a common axis, there being means to connect one of them to a device to be driven and the other of them to a rotating drive means; reciprocable reaction means carried by said first member and being adapted to resist reciprocation; and means for reciprocating said reaction means comprising a wobble plate supported so that it will oscillate and reciprocate said reaction means, an annular member rotating with said second member in a plane perpendicular to said axis and in spaced relation to said wobble plate, a roller disposed between said annular member and said wobble plate and to roll therebetween through an annular path at a velocity which is intermediate the velocities of said annular member and said wobble plate, and means to axially shift said annular member.

17. In a power transmission of the character described, the combination of: first and second rotatable members disposed in cooperative relation on a common axis, there being means to connect one of them to a device to be driven and the other of them to a rotating drive means; reciprocable reaction means carried by said first member and being adapted to resist reciprocation; means for reciprocating said reaction means comprising a wobble plate supported so that it will oscillate and reciprocate said reaction means, an annular member rotating with said second member in spaced relation to said wobble plate, and a roller disposed between said annular member and said wobble plate and to roll therebetween through an annular path at a velocity which is intermediate the velocities of said annular member and said wobble plate; and means to increase the reaction of said reaction means against being moved by said wobble plate.

18. In a power transmission of the character described, the combination of: first and second rotatable members disposed in cooperative relation on a common axis, there being means to connect one of them to a device to be driven and the other of them to a rotating drive means; reciprocable reaction means carried by said first member and being adapted to resist reciprocation; means for reciprocating said reaction means comprising a wobble plate supported so that it will oscillate and reciprocate said reaction means, an annular member rotating with said second member in spaced relation to said wobble plate, a roller disposed between said annular member and said wobble plate and to roll therebetween through an annular path at a velocity which is intermediate the velocities of said annular member and said wobble plate, and means to axially shift said annular member; and means to increase the reaction of said reaction means against being moved by said wobble plate.

19. In a power transmission of the character described, the combination of: first and second rotatable members disposed in cooperative relation on a common axis, there being means to connect one of them to a device to be driven and the other of them to a rotating drive means; reciprocable reaction means carried by said first member and being adapted to resist reciprocation; and means for reciprocating said reaction means comprising a wobble plate supported so that it will oscillate and reciprocate said reaction means, an annular member rotating with said second member in spaced relation to said wobble plate, a roller disposed between said annular member and said wobble plate and to roll therebetween through an annular path at a velocity which is intermediate the velocities of said annular member and said wobble plate, and governor means rotating with said second member and being operative to axially shift said annular member.

THOMAS L. MORRIS.